US009622620B2

(12) United States Patent
Silberberg et al.

(10) Patent No.: US 9,622,620 B2
(45) Date of Patent: Apr. 18, 2017

(54) DEVICE FOR CUTTING SMALL FOOD ITEMS

(71) Applicant: HELEN OF TROY LIMITED, Belleville, St. Michael (BB)

(72) Inventors: Yoni Silberberg, Modiin (IL); Daniel Leibovics, Hana (IL); Shelley Palazzolo, Brooklyn, NY (US); Sunny Kim, Astoria, NY (US); Troy Phipps, Brooklyn, NY (US)

(73) Assignee: Helen of Troy Limited, Belleville, St. Michael (BB)

( * ) Notice: Subject to any disclaimer, the term of this patent is extended or adjusted under 35 U.S.C. 154(b) by 364 days.

(21) Appl. No.: 14/017,457

(22) Filed: Sep. 4, 2013

(65) Prior Publication Data

US 2014/0137417 A1    May 22, 2014

Related U.S. Application Data

(60) Provisional application No. 61/796,660, filed on Nov. 19, 2012.

(51) Int. Cl.
*A47J 43/044* (2006.01)
*A47J 43/28* (2006.01)
*A47J 42/34* (2006.01)

(52) U.S. Cl.
CPC ............ *A47J 43/28* (2013.01); *A47J 42/34* (2013.01); *A47J 43/044* (2013.01)

(58) Field of Classification Search
USPC .............. 30/114, 280; 83/932, 437.2, 437.7; 99/537; 241/168, 169
See application file for complete search history.

(56) References Cited

U.S. PATENT DOCUMENTS

| 563,652 A | 7/1896 | Bulette |
| 2,572,770 A | 10/1951 | Shadduck |
| 2,683,566 A | 7/1954 | Bentley |
| (Continued) | | |

FOREIGN PATENT DOCUMENTS

| EP | 1269861 | 1/2003 |
| WO | 2012/120493 | 9/2012 |

OTHER PUBLICATIONS

Provisional patent application (publicly disclosed prior to Nov. 19, 2011).

(Continued)

*Primary Examiner* — Omar Flores Sanchez
(74) *Attorney, Agent, or Firm* — Rankin, Hill & Clark LLP

(57) ABSTRACT

A hand-held device for cutting small food items includes a housing, a cutting member disposed adjacent a lower end of the housing, a plunger movable with respect to the housing toward and away from the cutting member, and a spring cooperating with the plunger. The housing includes a side wall having an opening through which small food items are loaded into an interior compartment of the housing. The plunger includes a ram for contacting a small food item loaded into the interior compartment of the housing, a button for being pressed by an operator's thumb to move the ram toward the cutting member, and a plunger rod connecting the button with the ram. The spring cooperates with the plunger biasing the ram away from the cutting member. Wings can be provided on the housing.

14 Claims, 6 Drawing Sheets

(56) References Cited

U.S. PATENT DOCUMENTS

| | | | |
|---|---|---|---|
| 2,782,826 A * | 2/1957 | Zysset | 241/272 |
| 3,830,151 A | 8/1974 | Gerson | |
| 4,557,053 A | 12/1985 | Hadley, Jr. | |
| 4,967,970 A | 11/1990 | Michel | |
| 5,216,031 A * | 6/1993 | Dobson et al. | 99/538 |
| 5,337,480 A * | 8/1994 | Codikow | 30/114 |
| 5,947,016 A * | 9/1999 | Repac et al. | 99/538 |
| 6,585,179 B2 * | 7/2003 | Weibel et al. | 241/169 |
| 6,604,454 B1 * | 8/2003 | Tateno | 99/510 |
| D489,585 S * | 5/2004 | Wong | D7/693 |
| 6,840,161 B2 | 1/2005 | Backus et al. | |
| 7,150,214 B2 | 12/2006 | Repac et al. | |
| 7,152,821 B2 * | 12/2006 | Aby-Eva et al. | 241/169 |
| 7,258,292 B2 * | 8/2007 | Cheung | 241/169 |
| 7,779,739 B2 | 8/2010 | Peterson et al. | |
| 7,975,947 B2 * | 7/2011 | Horstmann | 241/169 |
| 2002/0113155 A1 | 8/2002 | Weibel et al. | |
| 2005/0229405 A1 | 10/2005 | Endres et al. | |
| 2011/0108649 A1 | 5/2011 | Horstmann | |

OTHER PUBLICATIONS

Webpage; Casabella.com, Cherry Pitter.
Webpage; rosleusa.com, Rosle Cherry Pitter.
International Search Report filed in PCT/US2013/070517 mailed Apr. 14, 2014.

* cited by examiner

US 9,622,620 B2

DEVICE FOR CUTTING SMALL FOOD ITEMS

BACKGROUND

In February 2010, the American Academy of Pediatrics issued an updated policy statement entitled Prevention of Choking Among Children. In the policy statement, the Academy identified several foods that present choking hazards to young children. Grapes were one of those foods mentioned.

At present, grapes are typically sliced using a knife and a cutting board. For a caregiver who wishes to feed grapes to children, the cutting of grapes and other small food items such as cherry tomatoes, pitted cherries and the like, takes time and the results can be irregular slices or quarters of the food items. Moreover, for caregivers who are on the go, carrying a knife and a cutting board along with the small food items, requires more items to be packed and eventually cleaned later.

SUMMARY

An example of a hand-held device for cutting small food items that can overcome at least one of the aforementioned shortcomings includes a housing, a cutting member disposed adjacent a lower end of the housing, a plunger movable with respect to the housing toward and away from the cutting member, and a spring cooperating with the plunger. The housing includes a side wall having an opening through which small food items are loaded into an interior compartment of the housing. The plunger includes a ram for contacting a small food item loaded into the interior compartment of the housing, a button for being pressed by an operator's thumb or finger to move the ram toward the cutting member, and a plunger rod connecting the button with the ram. The spring cooperates with the plunger biasing the ram away from the cutting member.

Another example of a hand-held device for cutting small food items includes a housing, a cutting member disposed adjacent a lower end of the housing, a plunger movable along a vertical axis with respect to the housing, a spring cooperating with the plunger, and a wing extending away from the housing in a generally horizontal direction. The housing includes a side wall defining an interior compartment and having a loading opening. The plunger includes a ram, a button, and a plunger rod connecting the button with the ram. The spring cooperates with the plunger biasing the ram away from the cutting members. An upper surface of the button is spaced less than three inches from a lower surface of the wing measured along the vertical axis when the ram is biased furthest away from the cutting members.

DETAILED DESCRIPTION

Figure 1:
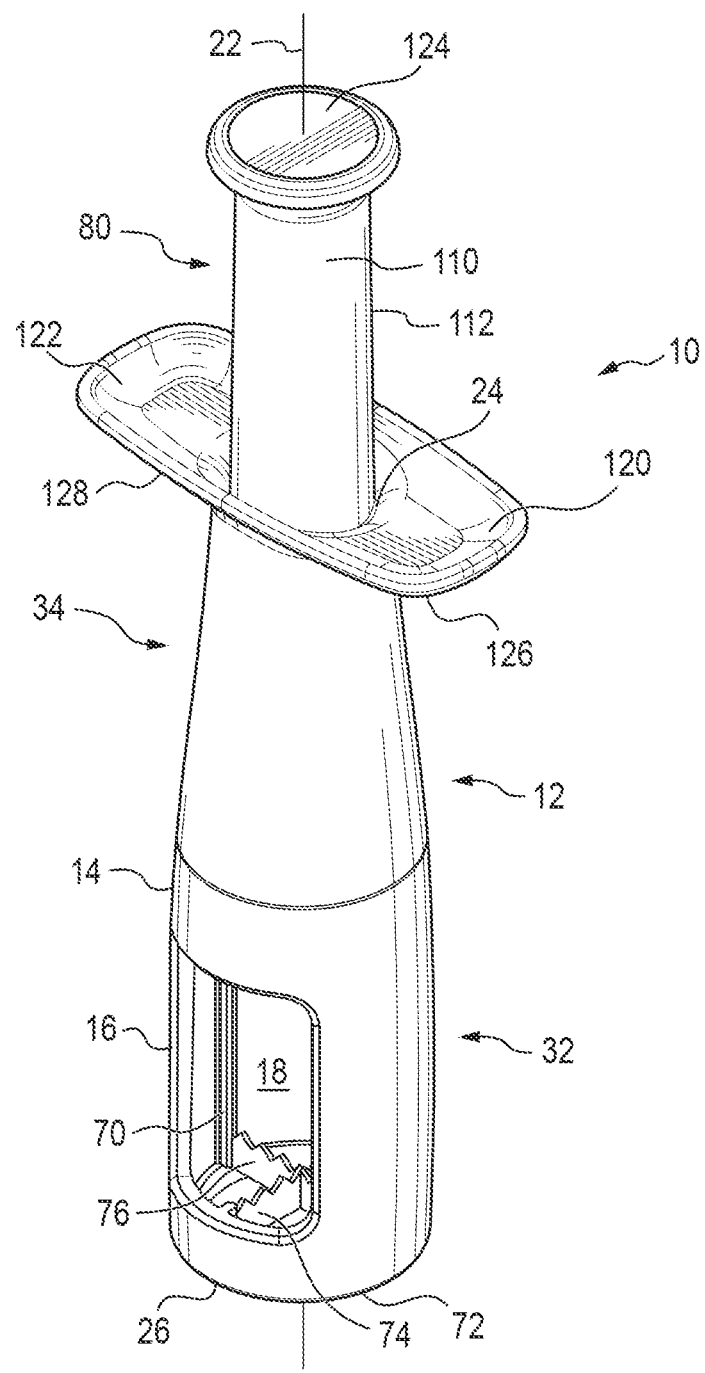
FIG. 1 is a perspective view of a device for cutting small food items.

FIG. 1 depicts a device 10 for cutting small food items. Such food items can include grapes, as well as other small food items such as cherry tomatoes, pitted cherries, and the like. The device is useful in cutting these small food items into smaller pieces that can be more easily swallowed by an infant or child.

Figure 2:
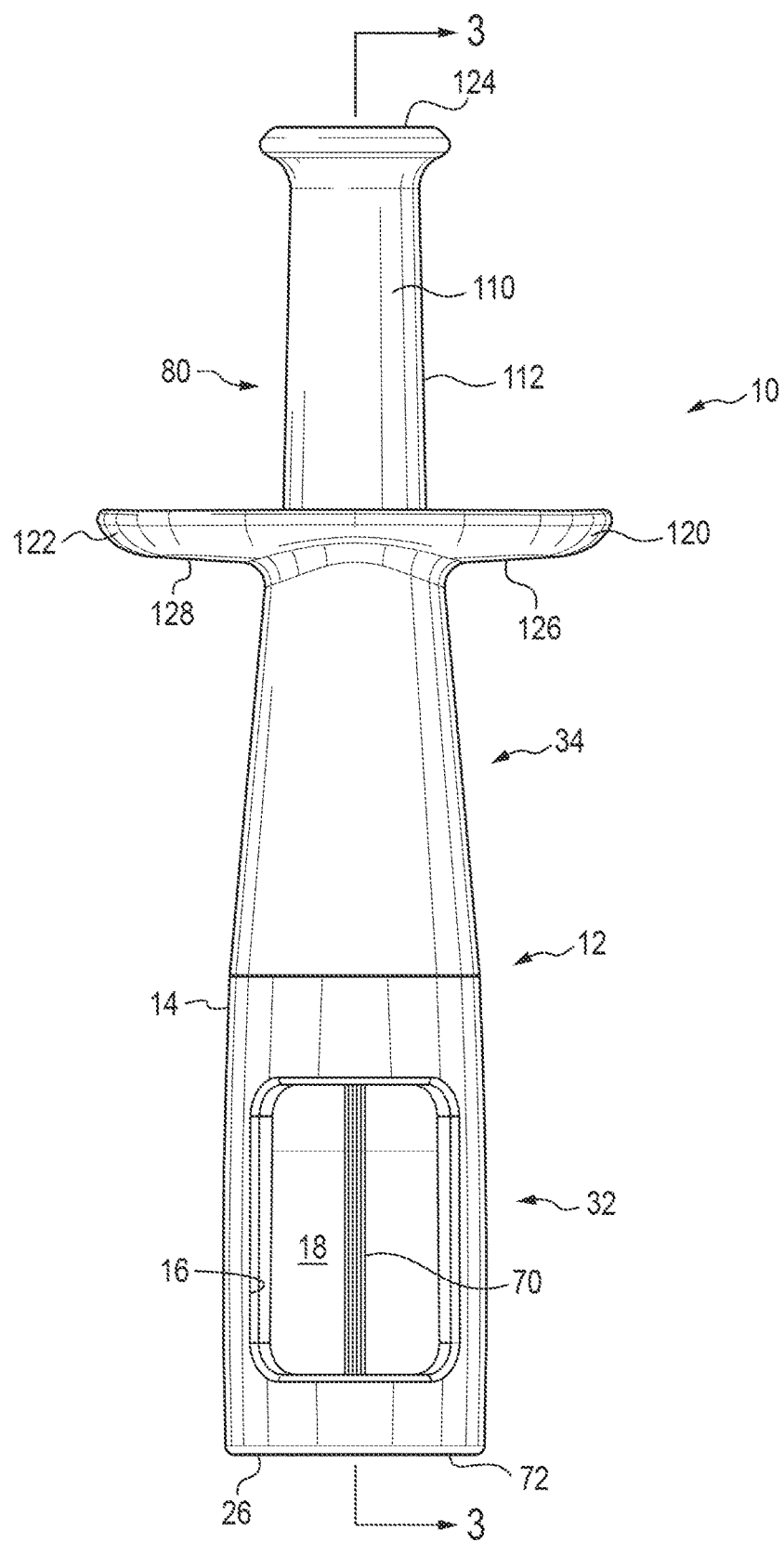
FIG. 2 is a front elevation view of the device depicted in FIG. 1.

The device 10 includes a housing 12 including a side wall 14 having a side opening 16 through which small food items are loaded into an interior compartment 18 of the housing 12. The side wall 14 of the housing 12 is generally cylindrical in configuration. The side wall 14 (as well as the device 10 in general) is centered about a vertical axis 22. In addition to the opening 16, which can also be referred to as a loading opening, the housing also includes an upper opening 24 and a lower opening 26, each of which can be circular in configuration. With reference to FIG. 2, the loading opening 16 is shown as generally rectangular; however, the loading opening 16 can take other configurations.

As illustrated, the housing 12 includes a lower section 32 and an upper section 34. As more clearly seen in FIG. 4, the lower section 32 is removably coupled to the upper section 34. As illustrated, the upper section 34 includes a threaded male portion 36 and the lower section 32 includes a threaded female portion 38 that receives the threaded male portion 36. In an alternative arrangement, the lower section 32 could include the female portion and the upper section 34 could include the male portion. As illustrated, the lower section 32 couples to the upper section 34 by inserting the upper section, and more particularly the threaded male portion 36, into the lower section 32 and rotating the upper section 34 or the lower section 32 with respect to the other. A threaded connection is shown; however, a bayonet connection or even another connection such as a press fit or friction fit is also contemplated.

Figure 3:
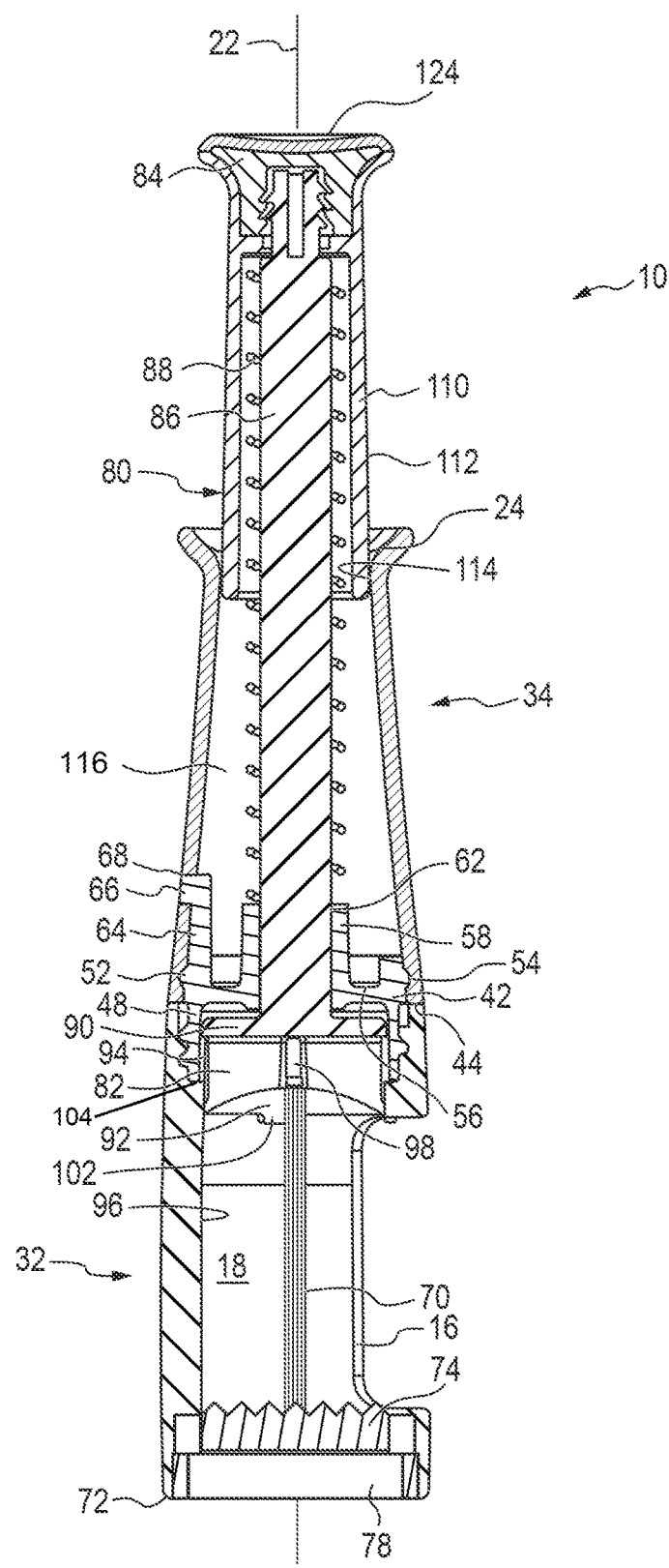
FIG. 3 is a cross-sectional view taken along line 3-3 of FIG. 2.

With reference to FIG. 3, a cylindrical insert 42 connects with the upper section 34 of the housing 12 to provide the threaded male portion 36. The cylindrical insert 42 is received in the upper section 34 and extends downwardly from a lower edge 44 of the upper section 34. It is the cylindrical insert 42 that includes external threads 46 that cooperate with the female threaded portion 38 of the lower section 32 of the housing 12.

With reference to FIG. 3, the cylindrical insert 42 includes a cylindrical outer wall 48. The cylindrical outer wall defines an outer diameter (OD) of the cylindrical insert 42. The OD of the cylindrical insert 42 is equal to an inner diameter of the upper section 34 of the housing 12 adjacent the lower edge 44. An annular protuberance 52 extends outwardly from the cylindrical outer wall 48 on the cylindrical insert 42. The upper section 34 of the housing 12 includes a corresponding circular recess 54 in which the annular protuberance 52 is received to connect to the cylindrical insert 42 with the upper section 34 of the housing 12. The cylindrical insert 42 also includes a web 56 that extends inwardly from the cylindrical outer wall 48 toward the vertical axis 22. A boss 58 extends upwardly from the web 56 in a generally vertical direction. The boss defines a vertical passage 62 that is concentric with the vertical axis 22.

The cylindrical insert 42 also includes a finger 64 that extends upwardly from the cylindrical outer wall 48. The finger 64 is resilient. A distal tab 66 on the finger is received in an opening 68 in the upper section 34 of the housing 12, which further secures the cylindrical insert 42 to the upper section 34 of the housing 12.

The lower section 32 of the housing 12 generally defines the interior compartment 18 in which the small food items are loaded that are to be cut. The lower section 32 includes internal vertical ribs 70 that extend from adjacent a lower end 72 of a lower section 32 up to the threaded female section 38 of the lower section 32.

The device 10 further includes cutting members, e.g., a first blade 74 and a second blade 76, disposed adjacent the lower end 72 of the housing 12. The first blade 74 is situated generally perpendicular to the second blade 76. This allows for quartering of the small food items that are placed into the interior compartment 18. Different types of cutting members, such as wires, could be provided. Moreover, the orientation of the cutting members can also change. With respect to FIG. 3, a ring 78 fixes the cutting members 74, 76 with respect to the housing 12. The cutting members 74, 76 can attach to the housing 12 in other conventional manners.

The device 10 further includes a plunger 80 that is movable with respect to the housing 12 toward and away from the cutting members 74, 76. With respect to FIG. 3, the plunger 80 generally includes a ram 82 for contacting the small food items loaded into the interior compartment 18 of the housing 12, a button 84 for being pressed by an operator's thumb of finger to move the ram 82 toward the cutting members 74, 76, and a plunger rod 86 connecting the button 84 with the ram 82. A spring 88 cooperates with the plunger 80 biasing the ram 82 away from the cutting members 74, 76. A lower circular flange 90 on the plunger rod 86 contacts the cylindrical insert 42 when the ram 82 is biased furthest away from the cutting members 74, 76. The ram 82 connects with the circular flange 90. The circular flange 90 is larger in diameter than the vertical passage 62 through which the remainder of the plunger rod 86 is able to move linearly and rotate freely. As such, the plunger 80 is maintained connected with the upper housing section 34 by the spring 88 biasing the circular flange 90 toward the cylindrical insert 42. In alternative arrangement, the lower end of the plunger rod could be the same diameter, but the lower end could connect directly with the ram 82, which is larger in diameter than the vertical passage 62.

The ram 82 includes a generally concave contact surface 92 for contacting the small food item loaded into the interior compartment 18 of the housing 12. The generally concave contact surface 92 is appropriately shaped to accommodate generally spherical small food items such as grapes, cherry tomatoes, cherries and the like. The periphery 94 of the ram 82 is generally cylindrical; however, the ram 82 is shaped in such a manner to preclude rotation of the lower section 32 of the housing 12 with respect to the ram 82, and vice versa. An inner surface 96 of the housing 12 is non-circular (at least along the lower section 32 by way of the vertical ribs 70). The periphery 94 of the ram 82 is a complementary non-circular configuration. In the illustrated embodiment, the ram includes vertical slots 98 that each receive a respective vertical rib 70 and feet 102 that contact a respective vertical rib 70 to preclude rotation of the ram 82 with respect to the lower section 32 of the housing 12.

The ram 82 depends below a lower most edge 104 of the male portion 36 (and the cylindrical insert 42) of the upper section 34 of the housing 12 when the ram 82 is biased furthest away from the cutting members 74, 76 and against the cylindrical insert 42. This can allow an operator to align the vertical slots 98 and the ram 82 with the vertical ribs 70 in the lower section 32 of the housing when connecting the upper section 34 to the lower section 32. When the vertical ribs 70 are received in the vertical slots 98, rotation of the ram 82 with respect to the lower section 32 of the housing 12 is precluded. However, the vertical passage 62 in the boss 58 of the cylindrical insert 42 is also circular about the vertical axis 22 and larger in diameter than the plunger rod 86. Rotation of the upper section 34 of the housing 12 with respect to the plunger 80 is still allowed, which allows for the threading of the upper section 34 into a lower section 32. When the upper section 34 is first threaded on to the lower section 32, the vertical slots 98 may not align with the vertical ribs 70. Rotation of the upper section 34 with respect to the lower section 32 can result in rotation of the ram 82 until the feet 102 contact a respective vertical rib 70. Since the vertical passage 62 in the boss 58 is larger in diameter than the plunger rod 86, rotation of the upper section 34 of the housing 12 with respect to the plunger 80 is still allowed.

Figure 5:
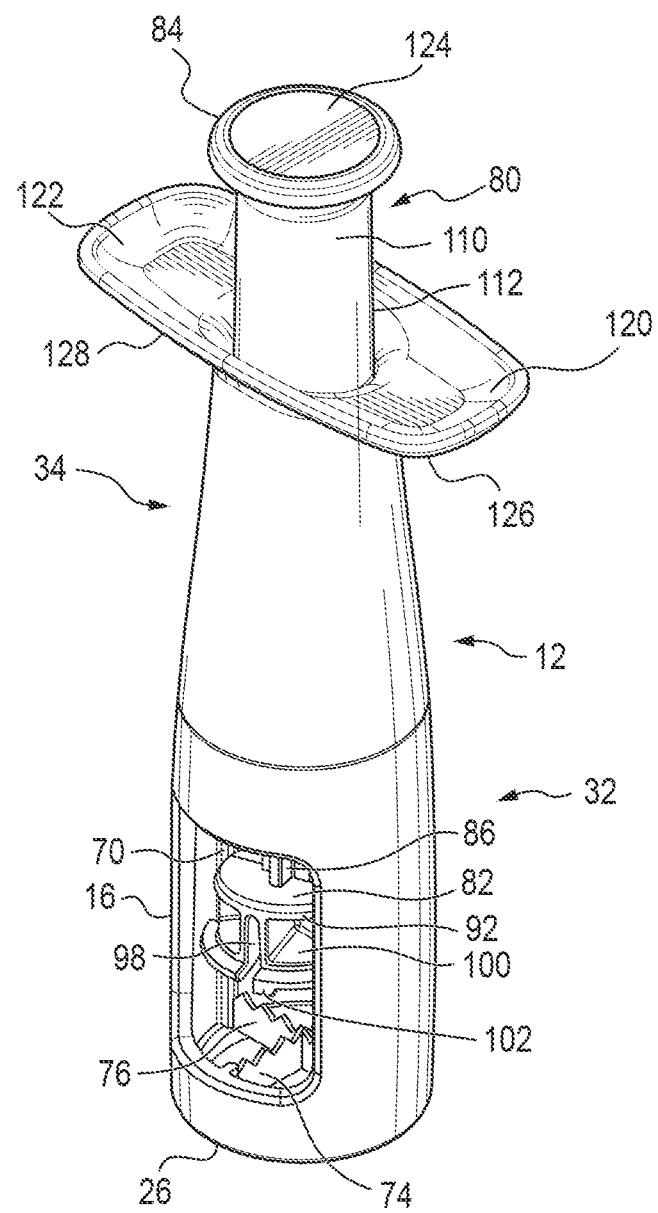
FIG. 5 is a perspective view of the device shown in FIG. 1 with a plunger of the device depressed.

The vertical slots 98 in the ram 82 are also aligned to receive the cutting members 74, 76 when the button 84 is depressed furthest. At least a portion of the contact surface 92 of the ram 82 can extend beyond (external of) the lower end 72 of the housing 12 when the button 84 is depressed furthest. In the illustrated embodiment, two slots 98 are provided and the slots intersect at the vertical axis 22 of the device 10. With reference to FIG. 5, the two slots 98 divide the ram 82 into four quartered sections 100. The maximum height of each slot 98, which is nearer the periphery 94 of the ram 82, is equal to or greater than the maximum height of the cutting members 74, 76. The aforementioned heights are measured parallel to the vertical axis 22. This allows the cutting members 74, 76 to be received inside the respective slots 98 and push out clean grape (or other small food item) quarters through the lower opening 26.

The device 10 also includes a plunger shroud 110 covering the spring 88 and the plunger rod 86. The plunger shroud 110 is generally cylindrical and centered about the vertical axis 22. An external surface 112 of the plunger shroud 110 contacts an internal surface 114 of the housing 12 adjacent the upper opening 24 of the housing. This contact makes it difficult for debris to enter into an upper interior compartment 116 of the upper section 34 of the housing 12, which is disposed above the cylindrical insert 42.

The device 10 further includes a wing, a first wing 120 and a second wing 122 are shown, extending away from the housing 12 in a direction generally perpendicular to the vertical axis 22 in which the plunger 80 moves. In an alternative embodiment, a flange, e.g., a circular flange, that surrounds the housing 12 could also operate as a wing. As illustrated the first wing 120 is diametrically opposed from the second wing 122. The wings 120, 122 provide a gripping surface for operation of the device 10. Since the device is for cutting small food items, the device is configured to be hand held. An upper surface 124 of the button 84 is spaced less than three inches, and can be less than two and one-half inches, from a respective lower surface 126, 128 of each wing as measured parallel to the vertical axis 22 when the ram 82 was biased furthest away from the cutting members 74, 76 (as shown in FIG. 1). The small distance between the upper surface 124 of the button 84 and the lower surface 126, 128 of each wing 120, 122 allows for a typical adult to easily grip the device 10 with one hand and operate the device with that same hand. In typical use, an operator places his thumb on the upper surface 124 of the button 84. The operator's first finger can contact the lower surface 126 of the first wing 120 and the middle finger can contact the lower surface 128 of the second wing 122. A small food item can then be inserted into the interior compartment 18 through the side opening 16. The operator then depresses the button 84 moving the ram 82 towards the cutting members 74, 76. This forces the small food item over the cutting members 74, 76 cutting the small food item and dispensing the cut small food item pieces through the lower opening 26. The spring 88 then biases the plunger 80 back toward the position where the ram 82 is biased furthest away from the cutting members 74, 76. The spring 88 is positioned between the boss 58 of the cylindrical insert 42 and the button 84. The spring 88 surrounds the plunger rod 86 and is a compression spring forcing the plunger upwardly in the vertical direction along the vertical axis 22.

As mentioned above, the housing 12 is generally cylindrical. The two wings 120, 122 are on opposite sides of the housing. The housing 12 is generally cylindrical and tapers inwardly towards the vertical axis 22 from adjacent the lower edge 44 of the upper section 32 towards the wings 120, 122. An outer diameter of the housing 12 is smaller adjacent the wings 120, 122 as compared to adjacent the lower edge 44 of the upper section 32. This tapering and/or smaller diameter adjacent the wings 120, 122 allows the device to be more easily gripped with one hand. As such, it is easier for the operator to insert the upper section 34 of the housing 12 between the first finger and the middle finger when operating the device 10. The ram 82, the button 84, and the plunger rod 86 are all centered along the vertical axis 22. This also allows for easier one-handed operation.

Figure 4:
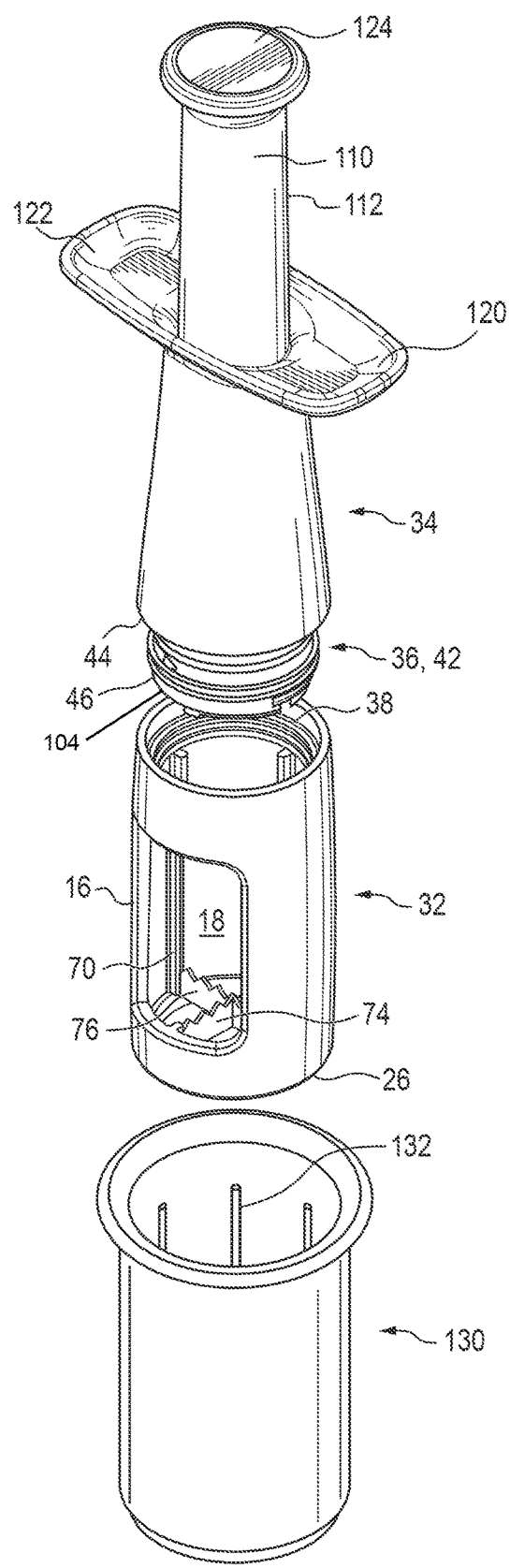
FIG. 4 is an exploded view of the device depicted in FIG. 1 and a cover.
Figure 6:
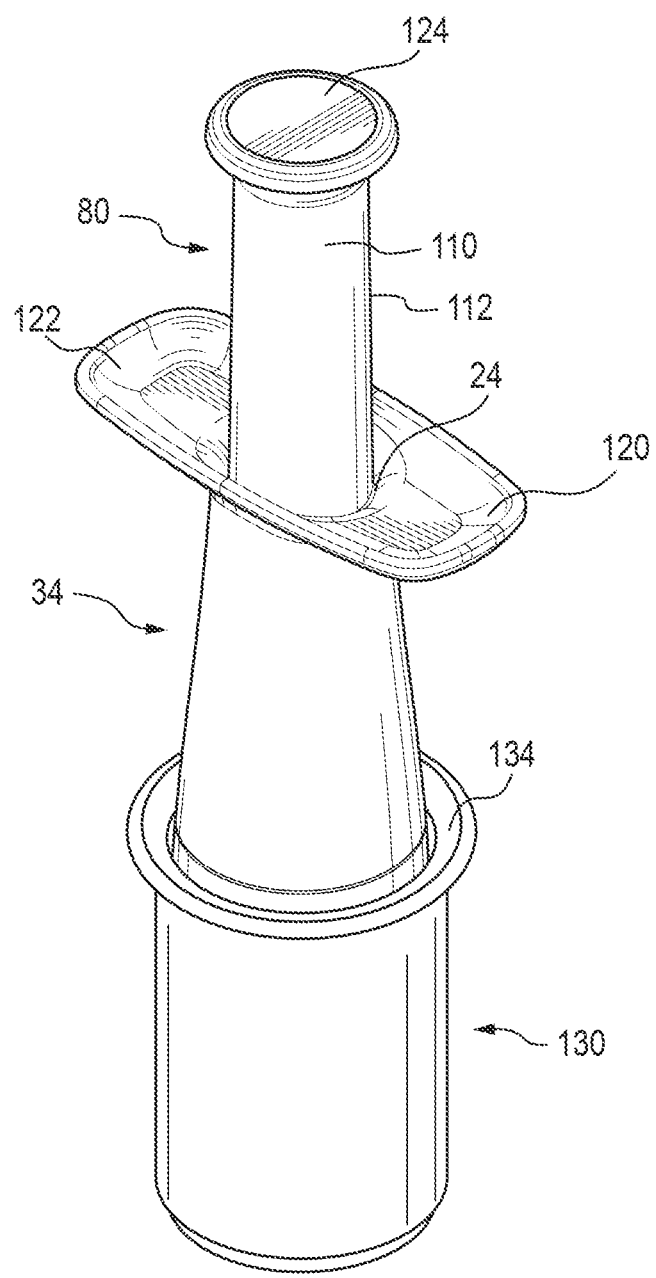
FIG. 6 is a perspective view of the device shown in FIG. 1 with the cover attached with the device.

As more clearly seen in FIGS. 4 and 6, a cover 130 can also be provided. The cover 130 is generally cup-shaped and covers the lower opening 26 and thus the cutting members 74, 76, and the side opening 16 when affixed to the housing 12. As such, the cutting members 74, 76 are covered with the cover 130 on the device 10 as shown in FIG. 6. The cover 130 also includes vertical ribs 132 that can engage the lower section 32 of the housing 12 to retain the cover on the housing. The cover 130 also includes a flange 134 to facilitate removal.

The device for cutting small food items has been described above with particularity. Modifications and alterations will occur to those upon reading and understanding the preceding detailed description. The invention is not limited to only the embodiment described above. Instead, the invention is broadly defined by the appended claims and the equivalents thereof. Also, it will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A hand-held device for cutting small food items comprising:
    a housing including a side wall having an opening through which small food items are loaded into an interior compartment of the housing, wherein the housing includes a lower section removably coupled to an upper section, wherein the upper section includes a threaded male portion and the lower section includes a threaded female portion that receives the threaded male portion;
    a cutting member disposed adjacent a lower end of the housing;
    a plunger movable with respect to the housing toward and away from the cutting member, the plunger including a ram for contacting a small food item loaded into the interior compartment of the housing, a button for being pressed by an operator to move the ram toward the cutting member, and a plunger rod connecting the button with the ram, wherein the ram includes a vertical slot and depends below a lowermost edge of the male portion when the ram is biased furthest away from the cutting members, wherein the ram depends below a lowermost edge of the male portion when the ram is biased furthest away from the cutting members;
    a spring cooperating with the plunger biasing the ram away from the cutting member;
    a wing extending away from the housing in a direction generally perpendicular to an axis in which the plunger moves, wherein an upper surface of the button is spaced less than three inches from a lower surface of the wing as measured parallel to the axis in which the plunger moves when the ram is biased furthest away from the cutting members; and
    a vertical rib formed along an inner surface of the lower section housing, wherein the ram includes at least one foot for contacting the vertical rib to preclude rotation of the ram with respect to the lower section of the housing, when the vertical rib is received in the vertical slot rotation of the lower section of the housing with respect to the ram is precluded, while rotation of the plunger with respect to the upper section is allowed.

2. The device of claim 1, wherein the wing further includes:
    a first wing and a second wing, each wing extending away from the housing in a direction generally perpendicular to an axis in which the plunger moves, wherein an upper surface of the button is spaced less than three inches from a lower surface of each wing as measured parallel to the axis in which the plunger moves when the ram is biased furthest away from the cutting members, wherein the first wing is diametrically opposed from the second wing.

3. The device of claim 1, wherein the ram includes a generally concave contact surface for contacting the small food item loaded into the interior compartment of the housing.

4. The device of claim 1, wherein the vertical slot has a maximum height equal to or greater than a maximum height of the cutting member.

5. The device of claim 1, further comprising a plunger shroud covering the spring and the plunger rod, wherein the plunger shroud is generally cylindrical and an external surface of the plunger shroud contacts an internal surface of the housing adjacent an upper opening of the housing.

6. A hand-held device for cutting small food items comprising:
    a housing including a side wall having a loading opening through which small food items are loaded into an interior compartment of the housing and a lower opening through which cut small food item pieces are dispensed;
    a cutting member disposed adjacent a lower end of the housing;
    a plunger movable with respect to the housing toward and away from the cutting member, the plunger including a ram for contacting a small food item loaded into the interior compartment of the housing, a button for being pressed by an operator to move the ram toward the cutting member, and a plunger rod connecting the button with the ram;
    a spring cooperating with the plunger biasing the ram away from the cutting member;

a wing extending away from the housing in a generally horizontal direction, wherein an upper surface of the button is spaced less than three inches from a lower surface of the wing measured along a vertical axis when the ram is biased furthest away from the cutting members; and a cover covering the loading opening and the lower opening of the housing.

7. The device of claim 6, wherein the housing is generally cylindrical and tapers inwardly toward the vertical axis from adjacent an upper surface of the ram toward the wing.

8. The device of claim 6, wherein an outer diameter of the housing is smaller adjacent the wing as compared to adjacent the ram.

9. The device of claim 8, wherein the housing includes a lower section removably coupled to an upper section, wherein the lower section couples to the upper section by inserting one of the sections into the other of the sections and rotating one of the sections with respect to the other of the sections.

10. The device of claim 9, wherein the device includes a cylindrical insert connected with the upper section, the cylindrical insert being received in the upper section and extending downwardly from the lower edge of the upper section, the cylindrical insert having external threads.

11. The device of claim 7, wherein the ram, the button, and the plunger rod are centered along the vertical axis.

12. A hand-held device for cutting small food items comprising:

a housing including a side wall having an opening through which small food items are loaded into an interior compartment of the housing;

a cutting member disposed adjacent a lower end of the housing;

a plunger movable with respect to the housing toward and away from the cutting member, the plunger including a ram for contacting a small food item loaded into the interior compartment of the housing, a button for being pressed by an operator to move the ram toward the cutting member, and a plunger rod connecting the button with the ram;

a spring cooperating with the plunger biasing the ram away from the cutting member; and a wing extending away from the housing in a direction generally perpendicular to an axis in which the plunger moves, wherein an upper surface of the button is spaced less than three inches from a lower surface of the wing as measured parallel to the axis in which the plunger moves when the ram is biased furthest away from the cutting members.

13. The device of claim 12, wherein the wing further includes a first wing and a second wing, each wing extending away from the housing in the direction generally perpendicular to the axis in which the plunger moves.

14. The device of claim 12, further comprising a plunger shroud covering the spring and the plunger rod, wherein the plunger shroud is generally cylindrical and an external surface of the plunger shroud contacts an internal surface of the housing adjacent an upper opening of the housing.

* * * * *